Oct. 25, 1960 D. W. FRASER ET AL 2,958,049

SYNCHRONIZED OSCILLATOR WITH ELECTRON-COUPLED REFERENCE TIMING SOURCE

Filed Feb. 13, 1956 2 Sheets-Sheet 1

INVENTORS
Donald Woodrow Fraser
Walter Bruce Warren, Jr.

BY

ATTORNEY

Oct. 25, 1960 D. W. FRASER ET AL 2,958,049

SYNCHRONIZED OSCILLATOR WITH ELECTRON-COUPLED REFERENCE TIMING SOURCE

Filed Feb. 13, 1956

2 Sheets-Sheet 2

INVENTORS
Donald Woodrow Fraser
Walter Bruce Warren, Jr.

BY [signature]

ATTORNEY

1

2,958,049

SYNCHRONIZED OSCILLATOR WITH ELECTRON-COUPLED REFERENCE TIMING SOURCE

Donald Woodrow Fraser, Wakefield, R.I., and Walter Bruce Warren, Jr., Atlanta, Ga., assignors to Georgia Tech Research Institute, Georgia Institute of Technology, Atlanta, Ga., a corporation of Georgia Filed Feb. 13, 1956, Ser. No. 565,047

4 Claims. (Cl. 331—55)

This invention relates to means for providing stable oscillators and particularly to the controlling of a remote oscillator by a crystal-controlled oscillator through a signal wave consisting of a reference frequency and side-bands or harmonics thereof generated in the circuit connecting the crystal-controlled oscillator with the remote oscillator.

It is an important object of this invention to provide simple means whereby an oscillator working in a communications band may be synchronized with and controlled by a crystal-controlled oscillator through spectrum generating means interposed between the communications oscillator and the crystal-controlled oscillator.

It is a further object of this invention to provide means whereby an oscillator working in a communication band may be tuned to an approximately correct frequency in discrete steps and then locked into step for crystal-controlled stability through spectrum-generating means in the circuit connecting the communications oscillator with the crystal-controlled oscillator.

It is a further object of this invention to provide means whereby an oscillator working in a communications band at a high frequency may be synchronized with and controlled by an oscillator which is crystal controlled and working at a lower frequency.

It is a further object of this invention to lock an oscillator working in the communications band with any one of a plurality of sidebands of a reference frequency timing source.

It is a further object of this invention to provide means whereby an oscillator working in a communications band may be locked in synchronization with any one of a plurality of output frequencies of a spectrum generator which is shock-excited by a reference frequency timing source.

Figure 1:
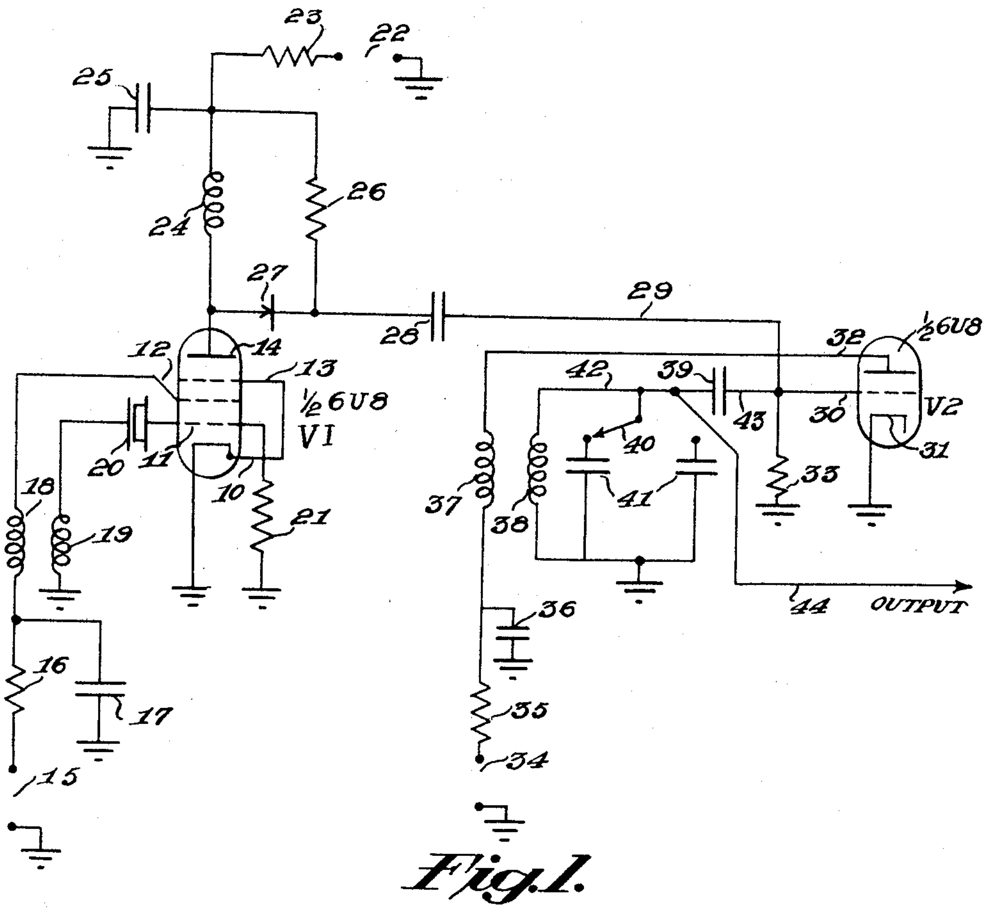
Fig. 1 is a circuit diagram of means for controlling a communications oscillator by a crystal-controlled oscillator through spectrum-generating means and with circuit constants shown for illustration purposes for the use of the invention within a certain frequency range.

Referring in detail to the drawings and first with particular reference to Figure 1 there are means by which an oscillator, tunable in discrete steps, and operating in a communications frequency band, may be controlled by a single crystal-controlled oscillator operating at a much lower frequency than the communications oscillator, but functioning also as a spectrum generator with an output of damped waves of proper decrement and rate of repetition. For purposes of illustration only, constants are shown so that the crystal-controlled oscillator may function as a spectrum generator covering a suitable frequency range.

2

The technique involved is based upon the known fact that a damped wave of proper decrement and rate of repetition produces frequency components whose amplitudes, over a prescribed range, are essentially constant.

In Fig. 1, electron tube V1 serves both as the negative resistance component of a 100 kilocycle crystal-controlled oscillator (by means of its screen grid, control grid and cathode), and also as the input to a spectrum generator embodied as a peaking coil and a damping diode in its plate circuit. The oscillator portion is operated in a class C manner so that pulses of plate current, occurring at a rate determined by the 100 kilocycles crystal-controlled oscillator, shock-excite the peaking coil. The output of the plate circuit network consists of damped waves whose spectrum has frequency components which are multiples of 100 kilocycles, and which have nearly uniform amplitude over the frequency range of 100 kilocycles to 3 megacycles or higher. In this particular example the frequency components 1.5, 1.6 . . . 2.4 2.5 megacycles are of the greatest interest because the other oscillator, which employs V2 as a negative resistance element is adjusted to tune, in discrete steps, over the approximate range of 1.5 to 2.5 megacycles.

The frequency components in the spectrum of the output of V1 are applied to V2 and will cause V2 to operate as a controlled oscillator and to synchronize to whichever one of the components of the spectrum happens to fall within the band of synchronization of the oscillator V2. The oscillator V2 is tuned in discrete steps by means of switching appropriate capacitors in shunt with coil 38. The tuning process adjusts the running frequency of the oscillator V2 to the approximate frequencies of 1.5, 1.6 . . . etc. megacycles, through the range of 1.5 to 2.5 megacycles, inclusive. The appropriate synchronizing component of the output of the spectrum of V1, the crystal-controlled oscillator, then locks the second oscillator V2 to an exact multiple of the frequency of the 100 kilocycle crystal-controlled oscillator.

The voltage at the point marked "output" then contains the desired crystal-controlled frequency (1.5, 1.6 . . . etc. megacycles), and contains in addition, but in greatly reduced magnitude, those other frequency components produced in the plate circuit of V1. The relative magnitude of the undesired frequencies may be greatly reduced by a proper selection of the circuit parameters so as to produce negligible interference in many applications of the second oscillator V2.

In Fig. 1, a crystal-controlled oscillator V1, which may be a part of a type 6U8 tube, includes a cathode 10, a control grid 11, a screen grid 12, a suppressor grid 13, and a plate 14. A 300 volt source 15 is connected to the screen grid through a 33K resistor 16, by-passed by a capacitor 17, and through a coil 18, which is inductively coupled to a coil 19 connected in series with a crystal 20 which is connected to the control grid 11. One end of the coil 19 is connected to ground, or the chassis, and the control grid 11, is also connected to ground through a 330K resistor 21. The suppressor grid 13, is connected to the cathode 10 and to ground. The cathode 10, control grid 11 and screen grid 12 of the circuits of tube V1 constitute a reference timing source.

The plate 14 is fed from a 300 volt source 22, through a 39K resistor 23, and through a peaking coil 24. A capacitor 25 is connected to the junction of the resistor 23 and the peaking coil 24, and to ground. Plate 14, control grid 11 and cathode 10 constitute the spectrum generating means electronically coupled with the reference timing source through the electron stream extending from cathode 10 to the plate 14 in tube V1. It will be noted that the high potential for the reference timing source is located at 15, whereas the high potential source for the plate-grid-cathode circuit 14—11—10 constituting the spectrum generating means is located at 22; thus oscillations are sustained in tube V1 with screen grid 12 functioning as a virtual plate in the operation of the circuit 10—11—12 as a reference timing source while the plate 14, control grid 11 and cathode 10 simultaneously operate through the same electron stream of tube V1 as a spectrum generating means. The high potentials for the separate oscillation systems are wholly independent and the two oscillations systems are intercoupled electronically through the electron stream of the tube V1. The peaking coil 24 is a part of a network which comprises the peaking coil 24 paralleled by a one thousand ohm resistor 26 which is in series with a diode 27 constituting rectification means, and the output of this network is fed through a capacitor 28, and a wire 29 to the grid 30 of the second oscillator V2. The second oscillator V2 includes the grid 30, a cathode 31 and a plate 32. The grid 30 is connected by a 33K resistor 33 to ground.

The plate 32 is fed from a 300 volt source 34 through a 39K resistor 35, which is by-passed to ground by a capacitor 36, and through a coil 37, which is inductively coupled to a coil 38 in the circuit of the grid 30.

The coil 38 is tuned in discrete steps by a plurality of capacitors 41 connectable at will through a switch 40, and connected to a wire 42, which is connected to one end of the coil 38. The other end of the coil 38 is connected to ground and to the other ends of the capacitors. The coil 38 is also connected by the wire 42, to the grid 30 through a capacitor 39, and a wire 43. An output connection 44 is taken off the wire 42.

Figure 2:
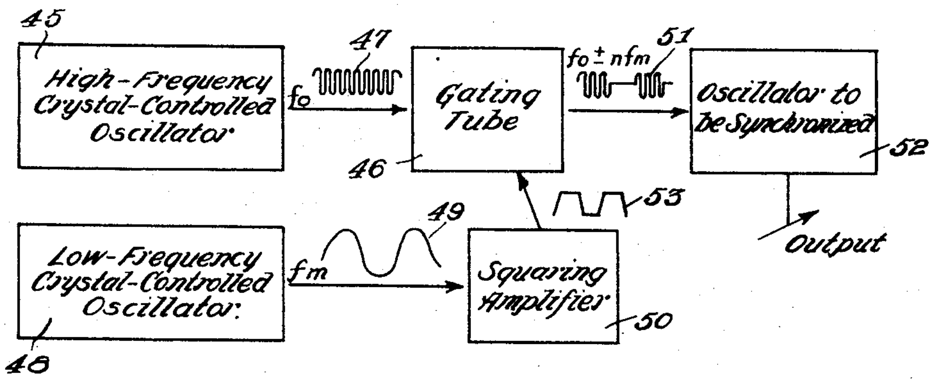
Fig. 2 is a block diagram of certain conventional equipment assembled in operative relation for controlling a communications oscillator by a crystal-controlled oscillator.

In Fig. 2, a high-frequency crystal-controlled oscillator 45 is connected to a gating tube 46 to deliver to it a sine wave as indicated at 47. A low-frequency crystal-controlled oscillator 48 delivers a sine wave, as indicated at 49, to a squaring amplifier 50, which delivers a substantially square wave 53 to the gating tube 46, to cause the gating tube to produce an output waveform in the nature of an interrupted wave train, as indicated at 51. This wave train, comprising spectrum components to be hereinafter described, is fed to an oscillator 52 which is tuned in discrete steps after the manner of the tuning of the oscillator V2 of Fig. 1.

The equipment included in the blocks is conventional. The oscillator 45 operates at high frequency with its output, multiplied if necessary, adjusted to the frequency which is centered within a particular section of the communication band utilized by the oscillator 52. This reference center, the frequency at which the oscillator 45 operates, is designated as $f_o$. The other crystal-controlled oscillator 48 operates at a lower frequency, a frequency which is exactly equal to a multiple of the frequency difference between adjacent channels of the communication band. This multiple may, in practice, be any number from one to ten, but for simplicity in the present discussion it may be assumed to be unity. The frequency of oscillator 48 is designated as $f_m$.

Figure 3:
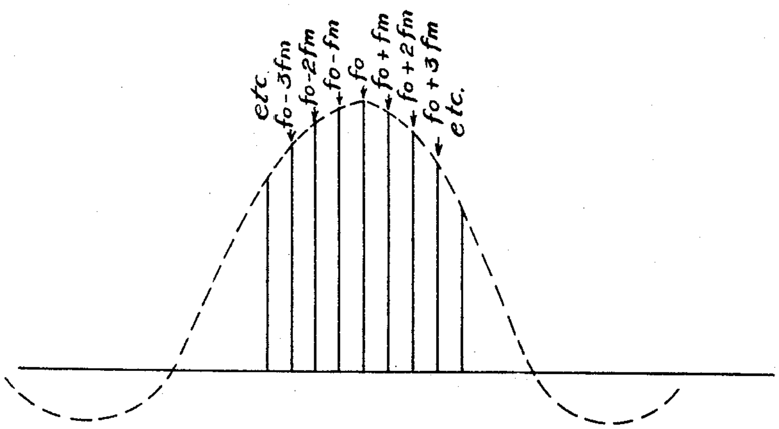
Fig. 3 is an illustration of a spectrum output of a gating tube shown in Fig. 2.

The frequency spectrum of the output of the gating tube 46 is well known to be of the form shown in Figure 3. It consists of frequencies $f_o \pm nf_m$ ($n=0, 1, 2, 3 \ldots$) whose relative magnitude depends upon the duty cycle, the ratio of "on" to "off" time. If this ratio is small the amplitude of the first several side bands ($n=1$, 2, etc.) is not appreciably smaller than that of the center frequency.

The oscillator 52 may be synchronized in turn by each of several frequencies illustrated in Fig. 3. Of particular significance is the fact that, since these frequencies each correspond exactly (within the accuracies of the crystal-controlled oscillators 45 and 48) to a specific frequency of the communication band, the possible frequencies of the synchronized oscillator 52, will each correspond precisely to the center of a communication band.

The oscillator 52 may be tuned in discrete steps, as shown in V2 of Figure 1, each step bringing it closer to the center of the channel of interest. Immediately upon bringing it closer to the center of this channel it becomes synchronized to the proper sideband (the selected frequency of $f_o \pm f_m$) and there results the oscillator 52 operating at the desired frequency and with crystal-controlled stability.

Change of frequency of the oscillator 52 between channels is accomplished simply by the step tuning already noted. At least ten channels can be encompassed by the simple arrangement shown, and twenty or more can be theoretically so controlled. The number may be multiplied, of course, by the use of different crystals in the oscillators 45 and 48.

Although the present invention is only described and illustrated in detail for two embodiments thereof, it is to be expressly understood that the same is not limited thereto. Various changes may be made in design and arrangement of the embodiment illustrated, as will now be apparent to those skilled in the art. For a definition of the limits of the invention, reference should be had to the appended claims.

What is claimed is:

1. A stable oscillator system comprising a controlled oscillator, a reference timing source and spectrum generating means comprising an electron tube including a cathode, a control grid, a screen grid electrode and a plate electrode, means connected with said control grid, said screen grid and said cathode constituting said reference timing source for sustaining constant amplitude oscillations, means connected with said plate and said other electrodes constituting said spectrum generating means for sustaining damped oscillations having a multiplicity of frequency components of essentially constant amplitude over a relatively broad frequency range, a network interconnecting said reference timing source and said spectrum generating means with said controlled oscillator, and an electronic coupling between said reference timing source and said spectrum generating means.

2. A stable oscillator system as set forth in claim 1 in which there is a separate source of high potential connected in circuit between said screen grid electrode and said cathode and between said plate and cathode.

3. A stable oscillator as set forth in claim 1 in which said controlled oscillator includes a second electron tube having at least a cathode, a control grid and an anode and wherein said network interconnecting said reference timing source and said spectrum generating means with said controlled oscillator is connected through a path extending between the plate of said first mentioned electron tube and the control grid of said second electron tube.

4. A stable oscillator as set forth in claim 1 in which said controlled oscillator includes a second electron tube having at least a cathode, a control grid and an anode and wherein said network interconnecting said reference timing source and said spectrum generating means with said controlled oscillator is connected through a path extending between the plate of said first mentioned electron tube and the control grid of said second electron tube and in which said path includes a capacitor external to said network and a rectifier internal of said network.

References Cited in the file of this patent

UNITED STATES PATENTS

| | | |
|---|---|---|
| 1,829,465 | Wolf | Oct. 27, 1931 |
| 2,155,649 | George | Apr. 25, 1939 |
| 2,248,481 | Schuttig | July 8, 1941 |
| 2,445,933 | Beste | July 27, 1948 |
| 2,457,830 | Mognahan | Jan. 4, 1949 |
| 2,484,763 | Sturm | Oct. 11, 1949 |
| 2,768,299 | Boff | Oct. 23, 1956 |